United States Patent
Higuchi et al.

(10) Patent No.: US 8,413,495 B2
(45) Date of Patent: Apr. 9, 2013

(54) APPARATUS FOR CORRECTING OUTPUT OF CYLINDER INTERNAL PRESSURE SENSOR, AND CYLINDER INTERNAL PRESSURE DETECTION APPARATUS INCLUDING THE SAME

(75) Inventors: Yuzo Higuchi, Aichi (JP); Yoshinori Tsujimura, Aichi (JP)

(73) Assignee: NGK Spark Plus Co., Ltd., Aichi (JP)

( * ) Notice: Subject to any disclaimer, the term of this patent is extended or adjusted under 35 U.S.C. 154(b) by 0 days.

(21) Appl. No.: 12/734,659

(22) PCT Filed: Jul. 29, 2008

(86) PCT No.: PCT/JP2008/063544
§ 371 (c)(1),
(2), (4) Date: May 14, 2010

(87) PCT Pub. No.: WO2009/096056
PCT Pub. Date: Aug. 6, 2009

(65) Prior Publication Data
US 2010/0229624 A1      Sep. 16, 2010

(30) Foreign Application Priority Data
Jan. 30, 2008   (JP) .................................. 2008-018442

(51) Int. Cl.
*G01M 15/04*   (2006.01)
(52) U.S. Cl. .................................................. 73/114.16
(58) Field of Classification Search .................... 73/1.57, 73/114.16
See application file for complete search history.

(56) References Cited

U.S. PATENT DOCUMENTS

| | | | | |
|---|---|---|---|---|
| 4,063,538 A | * | 12/1977 | Powell et al. | 123/406.42 |
| 4,328,779 A | * | 5/1982 | Hattori et al. | 123/406.33 |

(Continued)

FOREIGN PATENT DOCUMENTS

| | | |
|---|---|---|
| JP | 6-46348 | 6/1994 |
| JP | 7-280686 | 10/1995 |

(Continued)

OTHER PUBLICATIONS

International Search Report for International Application No. PCT/JP2008/063544, Sep. 2, 2008.

*Primary Examiner* — John Fitzgerald
(74) *Attorney, Agent, or Firm* — Kusner & Jaffe

(57) ABSTRACT

An output correction apparatus that corrects offset drift of a cylinder internal pressure sensor, and a cylinder internal pressure detection apparatus that accurately detects cylinder internal pressure of an internal combustion engine through use of the output correction apparatus. The cylinder internal pressure detection apparatus includes a detection circuit section which detects a change in the resistance of a piezoresistor element as an electrical signal; an amplification circuit section which amplifies and outputs the electrical signal (output value); and a correction circuit section which corrects the output value. The correction circuit section includes a reset control section which resets the output value of the amplification circuit section to a reference value, and a reset timing detection section which determines a timing of the resetting.

20 Claims, 11 Drawing Sheets

U.S. PATENT DOCUMENTS

| | | | |
|---|---|---|---|
| 4,466,405 A * | 8/1984 | Hattori et al. | 123/406.42 |
| 4,531,399 A * | 7/1985 | Aono | 73/1.59 |
| 6,810,320 B2 * | 10/2004 | Yamamoto et al. | 701/111 |
| 7,117,082 B2 * | 10/2006 | Kohira et al. | 701/114 |
| 7,117,725 B2 * | 10/2006 | Okubo et al. | 73/114.21 |
| 7,212,912 B2 * | 5/2007 | Okubo et al. | 701/114 |
| 7,454,286 B2 * | 11/2008 | Sinnamon et al. | 701/110 |
| 2003/0188714 A1 * | 10/2003 | Yamamoto et al. | 123/435 |
| 2004/0183398 A1 | 9/2004 | Kashiwase et al. | 310/319 |
| 2005/0199049 A1 * | 9/2005 | Okubo et al. | 73/115 |
| 2006/0142930 A1 * | 6/2006 | Okubo et al. | 701/114 |
| 2008/0154450 A1 * | 6/2008 | Sinnamon et al. | 701/20 |
| 2009/0005954 A1 * | 1/2009 | Sinnamon et al. | 701/102 |
| 2009/0312931 A1 * | 12/2009 | Wang et al. | 701/102 |

FOREIGN PATENT DOCUMENTS

| | | |
|---|---|---|
| JP | 2001-115886 | 4/2001 |
| JP | 2004-257888 | 9/2004 |
| JP | 2004-289278 | 10/2004 |

* cited by examiner

APPARATUS FOR CORRECTING OUTPUT OF CYLINDER INTERNAL PRESSURE SENSOR, AND CYLINDER INTERNAL PRESSURE DETECTION APPARATUS INCLUDING THE SAME

CROSS REFERENCE TO RELATED APPLICATIONS

This application is a U.S. National Stage Application under 35 U.S.C. 371 of International Application PCT/JP2008/063544 (published as WO 2009/096056), filed Jul. 29, 2008, which claims benefit of Japanese Patent Application 2008-018442, filed Jan. 30, 2008.

FIELD OF THE INVENTION

The present invention relates to an apparatus for correcting output of a cylinder internal pressure sensor which detects cylinder internal pressure of an internal combustion engine, and to a cylinder internal pressure detection apparatus including the same.

BACKGROUND OF THE INVENTION

In recent years, in an internal combustion engine, such as a diesel engine, fine operation control is generally performed on the basis of the state of combustion through, for example, control of fuel injection amount by means of electronic control, so as to meet requirements, such as improvement of fuel efficiency and reduction of emissions within exhaust gas.

One method of obtaining the combustion state of the internal combustion engine is detecting pressure within a cylinder (hereinafter referred to as the "cylinder internal pressure"). A cylinder internal pressure sensor is mounted on the internal combustion engine so as to detect the cylinder internal pressure, and an output waveform corresponding to the cylinder internal pressure is output from the cylinder internal pressure sensor as an output signal.

For example, the output of such a cylinder internal pressure sensor is zero (e.g., 0 mV) when combustion does not take place in the internal combustion engine (including a state where the internal combustion engine is stopped, and a state where the internal combustion engine is in a stroke in which the cylinder internal pressure does not increase, such as an exhaust stroke or an intake stroke). Meanwhile, when combustion takes place in the internal combustion engine; i.e., when the internal combustion engine is in a combustion cycle, the output of the cylinder internal pressure sensor periodically changes such that the output increases from zero to a predetermined significant figure (e.g., 10 mV). In such a case, computation processing performed in a cylinder internal pressure detection apparatus defines a reference value (in this case, 0 V), and acquires the significant figure to thereby detect the cylinder internal pressure. At the time of detection, the computation processing expands dynamic range by means of, for example, amplifying the difference between the reference value and the significant figure.

An output signal from a pressure sensor, including a cylinder internal pressure sensor, may drift (the waveform of the output signal may drift with the reference value) because of an abrupt change in the temperature of an environment in which the sensor is used. In the above-described example, the output of the sensor when combustion does not occur in the internal combustion engine becomes a predetermined significant figure (e.g., 100 mV), and the reference value shifts from 0 V. That is, a so-called offset drift may occur. Since the cylinder internal pressure sensor is mounted to an internal combustion engine or its vicinity, during use, the sensor cannot avoid an abrupt change in the temperature of the environment. Therefore, for accurate detection of cylinder internal pressure, the output signal must be corrected in order to eliminate any influence of drift. For example, the above-described computation processing may fail to accurately detect cylinder internal pressure when, due to a drift caused by a change in temperature, the sensor outputs a value equal to that at the time of combustion despite combustion not taking place in the internal combustion engine, or the value saturates after having exceeded a processable range of the cylinder internal pressure detection apparatus.

In order to correct such a drift, there has been proposed a technique for correcting the drift on the basis of the temperature characteristic of a cylinder internal pressure sensor and a measurement value from a separately provided temperature sensor. For example, see Japanese Patent Application Laid-Open (kokai) No. 2004-257888, hereinafter referred to as Patent Document 1. There has also been disclosed a technique for performing correction by externally inputting a detection signal from a crank angle sensor provided on an internal combustion engine, and resetting the output voltage of a cylinder internal pressure sensor to a reference value at a timing corresponding to a predetermined crank angle. For example, see Japanese Patent Application Laid-Open (kokai) No. 7-280686, hereinafter referred to as Patent Document 2.

BACKGROUND OF THE INVENTION

Problems to be Solved by the Invention

In the case where correction is performed through use of a temperature sensor, the temperature of a source that causes a drift of the output waveform of a cylinder internal pressure sensor (hereinafter also referred to as a "drift causing source") must be detected accurately. However, in reality, in many cases, accurate temperature measurement is impossible because of various factors; e.g., impossibility of disposition of a temperature sensor in the vicinity of a drift causing source. Therefore, a possible measurement error influences correction for drift, whereby the measurement error appears in the form of a correction error. Further, when a plurality of drift causing sources are present, a plurality of temperature sensors must be provided for all the sources in one-to-one relation. This makes configuration and correction processing complicated, and increases the scale of a circuit associated therewith.

Meanwhile, in the case where correction is performed through use of a crank angle sensor, a terminal for receiving a signal from the crank angle sensor must be separately provided on an output correction apparatus. This may increase the size of the apparatus.

The present invention has been conceived in view of the above-described circumstances, and an object of the invention is to provide an output correction apparatus which can correct offset drift of a cylinder internal pressure sensor, and a cylinder internal pressure detection apparatus which can accurately detect cylinder internal pressure of an internal combustion engine through use of the output correction apparatus.

SUMMARY OF THE INVENTION

Hereinbelow, configurations suitable for achieving the above-described object will be described in an itemized fashion. Notably, when necessary, action and effects peculiar to each configuration will be added.

Configuration 1

An output correction apparatus comprising reset means for obtaining an output waveform, as an output value, from a cylinder internal pressure sensor, the output waveform representing cylinder internal pressure of an internal combustion engine or a rate of change of the cylinder internal pressure of the internal combustion engine, and for resetting the output value representing the output waveform to a reference value, the output correction apparatus being characterized by comprising:

period determination means for determining a period of the output waveform on the basis of the output waveform obtained from the cylinder internal pressure sensor; and reset timing determination means for determining a timing for performing the resetting (hereinafter also referred to as "reset timing") on the basis of the period determined by the period determination means.

According to Configuration 1, the timing for performing the reset processing is obtained from the period of the output waveform of the cylinder internal pressure sensor, which corresponds to the combustion cycle of the internal combustion engine. Therefore, the offset drift of the sensor output can be eliminated at a predetermined timing of the combustion cycle without use of information from a crank angle sensor. Accordingly, separate provision of a terminal or the like for receiving a signal from the crank angle sensor is not required, whereby an increase in the size of the output correction apparatus can be prevented. In particular, in the case where a cylinder internal pressure detection apparatus in which the cylinder internal pressure sensor and the output correction apparatus are united together is mounted onto the internal combustion engine, the size of the apparatus must be reduced in consideration of vibration durability or the like. Therefore, the above-mentioned effect is significant. Further, in the above-described configuration, on the basis of the output waveform rather than temperature information, the output correction apparatus resets the output value of the cylinder internal pressure sensor to the reference value, to thereby correct the sensor output. Therefore, separate acquisition of information regarding temperature of the drift causing source is not required. As a result, the cylinder internal pressure of the internal combustion engine can be accurately detected without making the configuration and correction processing complex.

Notably, the above-described reset timing determination means can determine the reset timing on the basis of a previously set arithmetic expression and by use of the period of the output waveform of the cylinder internal pressure sensor as a variable. For example, a timing (t+nΔt) after elapse of a time nΔt, which is obtained by multiplying the period Δt of the output waveform by a predetermined coefficient n, from a predetermined reference point t (a point in time when the sensor output value exceeded a predetermined threshold previously or a point in time when the resetting was performed previously) is set as a reset timing Rt. In this case, an arithmetic expression (e.g., Rt=t+nΔt) required to calculate the reset timing from the waveform period of the sensor output is an expression which can render the reset timing coincident with a desired timing in the combustion cycle at which the cylinder internal pressure of the internal combustion engine becomes the lowest, in order to properly eliminate the offset drift of the sensor output. Accordingly, through employment of a measured value (variable) whose measurement time is relatively long, such as the waveform period Δt of the sensor output, as a variable for obtaining the reset timing which is rendered coincident with a desired timing in a single combustion cycle of the internal combustion engine, the ratio of its measurement error to the measured value (variable) can be reduced. As a result, the measurement error of the measured value (variable) becomes more unlikely to affect the calculation error of the reset timing, whereby a deviation between the actual reset timing and a desired timing can be made relatively small, and the sensor output can be corrected at good timing.

Configuration 2

In the output correction apparatus according to Configuration 1, the period determination means determines, as the waveform period, a time interval between a point in time at which the output value of the cylinder internal pressure sensor exceeded a predetermined threshold in a predetermined direction and a point in time at which the output value again exceeded the threshold in the predetermined direction is determined as the waveform period.

According to Configuration 2, the waveform period of the sensor output is actually measured through relatively simple processing of previously setting a single threshold and detecting a time when the output value exceeded the threshold. As a result, the circuit configuration and the correction processing can be simplified further. Needless to say, this threshold is within a range of variation of the output value of the cylinder internal pressure sensor input to the output correction apparatus (that is, the input value of the output correction apparatus), and must be greater than minute noise which is superimposed on the sensor output due to an external factor.

Configuration 3

In the output correction apparatus according to Configuration 2, when the output value of the cylinder internal pressure sensor exceeded the threshold in the predetermined direction, the threshold is increased or decreased in a direction opposite the predetermined direction.

In general, due to influence of vibration or the like from the internal combustion engine, a noise waveform whose period is shorter than that of the output waveform of the cylinder internal pressure sensor may be superimposed on the output waveform of the cylinder internal pressure sensor. In such a case, if the period of the output waveform is determined as in the above-described Configuration 2, the output value is erroneously determined to have exceeded the threshold because of the output waveform of the cylinder internal pressure sensor, when the output value having a noise waveform superimposed thereon exceeded the threshold. In such case, proper determination of the period of the output waveform may be impossible. In contrast, according the above-described Configuration 3, there can be employed a configuration in which, at a point in time at which the output value of the cylinder internal pressure sensor exceeded a first threshold value, the threshold value is changed to a second threshold value, which is lower than the first threshold value; and, at a point in time at which the output value of the cylinder internal pressure sensor became less than the second threshold value, the threshold value is changed to the first threshold value. In this case, the time interval between a certain point in time at which the output value of the cylinder internal pressure sensor exceeded the first threshold value and a subsequent point in time at which the output value of the cylinder internal pressure sensor again exceeded the first threshold value is measured as the period of the output wave of the cylinder internal pressure sensor. That is, the output correction apparatus of Configuration 3 can be said to be an "output correction apparatus according to Configuration 2, wherein the threshold has first and second threshold values which differ from each other; when the output value of the cylinder internal pressure sensor exceeded the first threshold value in the predetermined direction, the threshold is changed to the second threshold value which is increased or decreased from the first threshold value in the direction opposite the predetermined direction; and when the output value of the cylinder internal pressure sensor exceeded the second threshold value in the direction opposite the predetermined direction, the threshold is changed from the second threshold value to the first threshold value." As described above, through employment of a configuration which can change the threshold between two values whose difference is greater than the amplitude of an expected noise waveform, the period of the output waveform of the cylinder internal pressure sensor can be measured properly without being influenced by noise. As a result, the accuracy of the period measurement can be improved.

Configuration 4

In the output correction apparatus according to Configuration 2 or 3, the period determination means measures an amount of change of the waveform period from a difference between a time interval between a first point in time at which the output value of the cylinder internal pressure sensor exceeded the threshold in the predetermined direction and a second point in time at which the output value again exceeded the threshold in the predetermined direction, and a time interval between the second point in time and a third point in time at which the output value again exceeded the threshold in the predetermined direction; and the reset timing determination means calculates the reset timing in consideration of the amount of change of the waveform period.

In a period in which the rotational speed of the internal combustion engine is changing (acceleration/deceleration), the period of the output waveform of the cylinder internal pressure sensor is changing. Therefore, in some cases, even when the reset timing is determined on the basis of a specified single period, the determined reset timing becomes improper. In contrast, according to the above-described Configuration 4, since the reset timing is determined in consideration of not only the waveform period of the sensor output but also the amount of change of the waveform period, an optimal reset timing can be obtained in consideration of change in the rotational speed of the internal combustion engine. As a result, the deviation between the timing of actually effected resetting and a desired timing can be reduced. Notably, the first, second, and third points in time mean successive points in time at each of which the sensor output exceeded the threshold in the same direction. However, the present invention is not limited to the case where, when the reset timing is determined, the processing of determining the reset timing is performed only for two periods; i.e., a period at a predetermined time and the next period. The reset timing may be determined by specifying periods successively or redundantly.

Configuration 5

In the output correction apparatus according to any one of Configurations 2 to 4, the threshold is set within a range of variation of the cylinder internal pressure of the internal combustion engine in a compression stroke of a single combustion cycle of the internal combustion engine.

The output waveform of the cylinder internal pressure sensor may change depending on the type of the internal combustion engine and the rotational speed thereof. However, the output waveform in the compression stroke (the period between a point in time at which the intake valve of the internal combustion engine is closed and a point in time at which combustion starts) exhibits a small variation among cases which differ from one another in terms of engine type and/or rotational speed, and is relatively constant and stable. Accordingly, universality of the output correction apparatus can be enhanced through setting the threshold to fall within a range of variation of the cylinder internal pressure of the internal combustion engine in the compression stroke.

Configuration 6, in the output correction apparatus according to any one of Configurations 1 to 5, at least time measurement for measuring the waveform period and time measurement for determining whether or not the reset timing is reached are performed by use of a single time measurement means.

In general, when a plurality of types of time measurements, such as time measurement for measuring the waveform period and time measurement for determining whether or not the reset timing is reached, are to be performed, a plurality of time measurement means (timer circuits) are required. However, since an integrated circuit of the apparatus for correcting the output of the cylinder internal pressure sensor is very small, disposing a plurality of time measurement means may result in an increase in the scale of the circuit and an increase in production cost. In contrast, when at least the above-mentioned two time measurements are performed by use of a single time measurement means as in the above-described Configuration 6, the scale of the circuit and the production cost can be reduced. Further, in the case where another time measurement must be performed in addition to the above-mentioned two time measurements, these time measurements can be performed by use of the above-mentioned single time measurement means. Thus, the effect of the present configuration becomes remarkable. For example, in a configuration in which, separately from reset processing at the reset timing calculated based on the waveform period, reset processing is forcedly performed, (for example, when the output value of the cylinder internal pressure sensor is determined to fail to exceed the predetermined threshold within a set time), time measurement for determining whether or not the timing for the forced resetting is reached (measurement of the above-mentioned set time) may be performed by use of the above-mentioned single time measurement means, along with the above-described two time measurements.

Configuration 7

A cylinder internal pressure detection apparatus characterized by comprising:

a cylinder internal pressure sensor which outputs an electrical signal representing cylinder internal pressure of an internal combustion engine or a rate of change of the cylinder internal pressure of the internal combustion engine; and an output correction apparatus according to any one of Configurations 1 to 6.

According to Configuration 7, through integration of the cylinder internal pressure sensor and the output correction apparatus, the limited installation space of the internal combustion engine can be used effectively, and convenience is improved. Further, in the case where the cylinder internal pressure detection apparatus is integrated with a glow plug or the like, the action and effect of the present configuration can be enhanced further.

Notably, in the above-described invention, for sake of convenience, the value input to the output correction apparatus is referred to as the "output of the cylinder internal pressure sensor" (or a similar wording is used). Such wording is used for the following reason.

When the cylinder internal pressure sensor is actually mounted on an automobile and used, the output of the cylinder internal pressure sensor is amplified by a single or a plurality of amplification circuits, and is transmitted to an apparatus (ECU or the like) which obtains the combustion state of the internal combustion engine, as a signal representing the combustion state. In some cases, the output of the cylinder internal pressure sensor before being amplified by the amplification circuit(s) is very weak and/or the combustion state cannot be detected accurately due to noise or the like. In order to solve such a problem, the above-mentioned amplification circuit(s) is used. The output correction apparatus according to the present invention relates to a correction method for an output correction apparatus which is interposed between the cylinder internal pressure sensor and the ECU or the like and which has a function of correcting the output of the cylinder internal pressure sensor. Therefore, the signal input to the output correction apparatus can be a signal transmitted directly from the cylinder internal pressure sensor or a signal transmitted from the cylinder internal pressure sensor via the amplification circuit(s). Therefore, the expression "output of the cylinder internal pressure sensor" is used so as to encompass both cases.

DETAILED DESCRIPTION OF THE INVENTION

First Embodiment

Figure 2:
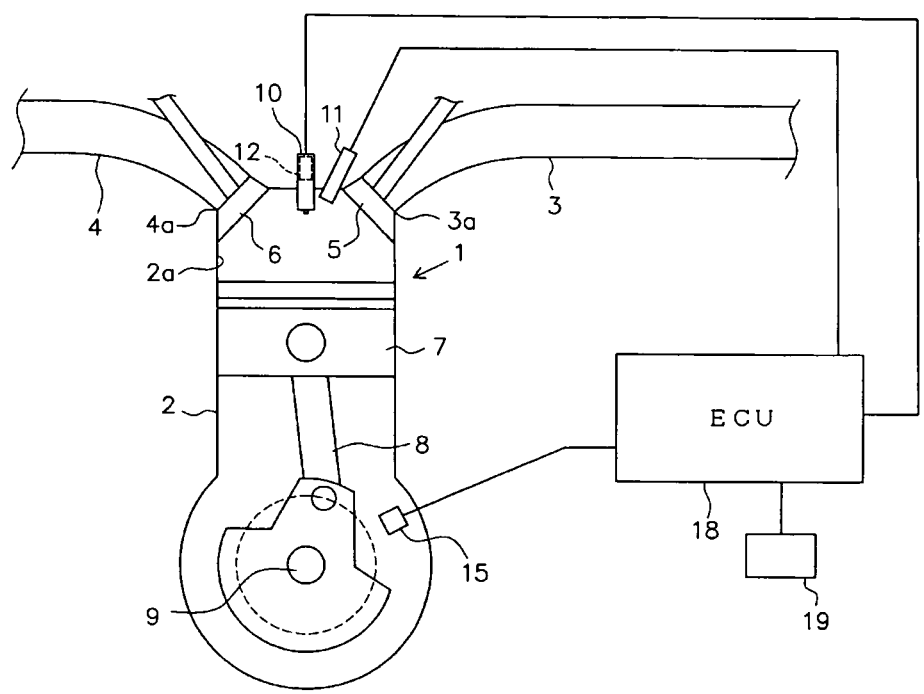
FIG. 2 is a schematic diagram showing the configuration of an engine control system.

One embodiment of the present invention will now be described with reference to the drawings. First, the structure of an internal combustion engine onto which a cylinder internal pressure detection apparatus according to the present invention is mounted is briefly described with reference to FIG. 2, while a 4-cycle diesel engine (hereinafter simply referred to as the "engine") is taken as an example. FIG. 2 is a schematic diagram showing the configuration of an engine control system.

An intake pipe 3 and an exhaust pipe 4 are connected to a cylinder 2 of an engine 1. An intake valve 5 is disposed in an intake port 3a of the cylinder 2 which communicates with the intake pipe 3, and an exhaust valve 6 is disposed in an exhaust port 4a of the cylinder 2 which communicates with the exhaust pipe 4.

A piston 7 is received within the cylinder 2, and is connected to a crank shaft 9 via a connecting rod 8. In addition to the intake valve 5 and the exhaust valve 6, tip ends of a glow plug 10 and a fuel injection nozzle 11 face or project into a space surrounded by an upper portion of the piston 7 and a wall surface of the cylinder 2; that is, a combustion chamber 2a.

The glow plug 10 includes a cylinder internal pressure detection apparatus 12 which detects the pressure within the combustion chamber 2a of the cylinder 2 (hereinafter referred to as the "cylinder internal pressure"), as will be described later. Further, a crank angle sensor 15 is provided so as to detect the rotational angle (crank angle) of the crank shaft 9. Detection signals output from various sensors, including the cylinder internal pressure detection apparatus 12 and the crank angle sensor 15, are fed to an electronic control unit (hereinafter referred to as the "ECU") 18 for engine control. The ECU 18 controls the amount of fuel injected from the fuel injection nozzle 11, among other parameters, on the basis of these detection signals and a detection signal which is fed from a throttle sensor 19 and changes in proportion to movement of an accelerator pedal.

When fuel is injected from the fuel injection nozzle 11 in a state where heat is generated upon supply of electricity to the glow plug 10, the fuel is ignited, whereby the engine 1 starts.

Figure 1:
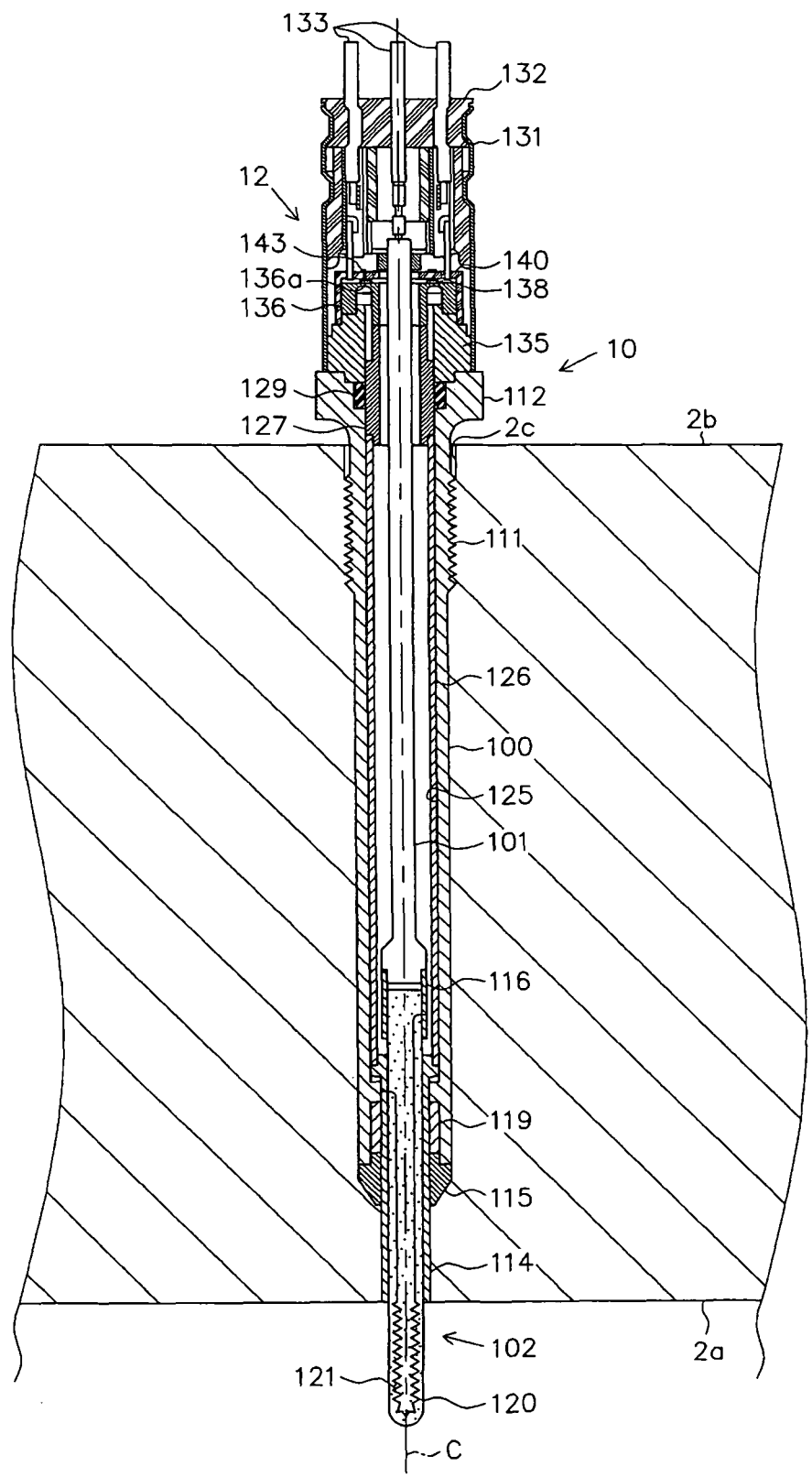
FIG. 1 is a partial sectional view of a cylinder head to which a glow plug is mounted.

Next, the structure and manner of attachment of the glow plug 10 including the cylinder internal pressure detection apparatus 12 according to the present invention will be described with reference to FIG. 1. FIG. 1 is a partial sectional view of the cylinder head 2b to which the glow plug 10 is mounted.

The glow plug 10 is attached to a plug attachment hole 2c formed in the cylinder head 2b, and is positioned such that its front end portion projects into the combustion chamber 2a.

The glow plug 10 includes a cylindrical metallic shell 100 extending along the direction of an axis C; an electrically conductive bar-shaped center rod 101 held within the metallic shell 100; and a bar-shaped heater member 102 disposed frontward of the center rod 101, and projects outward from a front end portion of the metallic shell 100.

An external thread portion 111 for fixing the glow plug 10 to the plug attachment hole 2c of the cylinder head 2b and a hexagonal tool engagement portion 112, with which a tool (such as a wrench), is engaged when the glow plug 10 is screwed, are formed on an outer circumferential surface of a base end portion of the metallic shell 100.

On the front end side of the metallic shell 100, there are provided a tubular heater holding member 114 into which a heater member 102 is press-fitted to be held therein, and a seal member 115 which closes a clearance between the heater holding member 114 and a front end portion of the metallic shell 100.

A base end portion of the heater member 102 is connected to a front end portion of the center rod 101 via a tubular, electrically conductive electrode member 116.

The heater member 102 is comprised of a substrate 120 formed of an insulating ceramic, and a heat generation element 121 buried in the substrate 120. One end of the heat generation element 121 is electrically connected to the center rod 101 via the electrode member 116, and the other end of the heat generation element 121 is electrically connected to the metallic shell 100 via the heater holding member 114. By virtue of this configuration, when the heater member 102 is increased in temperature, the current supplied to the heat generation element 121 via the center rod 101 flows to the cylinder head 2b via the metallic shell 100.

The heater holding member 114 is held by a holding member 119 formed of self-lubricating graphite such that the heater holding member 114 can move in the direction of the axis C. This configuration enables the heater holding member 114 and the heater member 102 press-fitted thereinto to move in the direction of the axis C in accordance with change in the cylinder internal pressure in the combustion chamber 2a.

Further, a cylindrical slide pipe 126 is slidably disposed in an axial hole 125 of the metallic shell 100. The front end of the slide pipe 126 is connected to the base end portion of the heater holding member 114, and a push pipe 127 is connected to the rear end of the slide pipe 126. Accordingly, when the heater holding member 114 moves, the slide pipe 126 and the push pipe 127 also move in the direction of the axis C.

The push pipe 127 projects from the base end portion of the metallic shell 100, and an o-ring 129 is fitted around the push pipe 127 in order to close a clearance between the push pipe 127 and the base end portion of the metallic shell 100.

The above-described cylinder internal pressure detection apparatus 12 is provided on the base end side of the metallic shell 100. The outer hull of the cylinder internal pressure detection apparatus 12 is comprised of a tubular housing 131 and a grommet 132 which closes a base end of the housing 131. A plurality of connection wires 133 are led into the interior of the cylinder internal pressure detection apparatus 12 through the grommet 132.

The cylinder internal pressure detection apparatus 12 includes an annular base 135 which surrounds the push pipe 127 and is attached to the base end portion of the metallic shell 100, and a diaphragm member 136 which is disposed on the base 135 in a state in which the diaphragm member 136 is in contact with a base end portion of the push pipe 127.

The diaphragm member 136 has a thin diaphragm portion 136a, which deforms when it is pushed by the push pipe 127. A piezoresistor element 138 is bonded to the diaphragm portion 136a so that, when the diaphragm member 136 deforms, the resistance of the piezoresistor element 138 changes.

Further, a printed circuit board 140 is disposed on the base end side of the diaphragm member 136. Electronic components, such as ICs, are mounted on the printed circuit board 140, whereby various electronic circuits are formed. When a pressure which the heater member 102 receives due to a change in the cylinder internal pressure within the combustion chamber 2a is transmitted to the piezoresistor element 138, a detection circuit section on the printed circuit board 140, which section is connected to the piezoresistor element 138 via bonding wires 143, detects a change in the resistance of the piezoresistor element 138 as an electrical signal. This detected electrical signal is amplified in an amplification circuit section, and is output to the outside as a detection signal which is proportional to the cylinder internal pressure. However, since this detection signal may suffer drift caused by various factors such as temperature, a correction circuit section for eliminating such drift is also provided on the printed circuit board 140. Since, as described later, processing for eliminating such drift is performed by resetting the output value of the amplification circuit section to a reference value, in the following description, this processing will be referred to as "resetting (reset processing)."

Notably, one of the above-mentioned plurality of connection wires 133 which is used for supply of electric power to the heater member 102 is electrically connected to a base end portion of the center rod 101. The remaining connection wires 133 are electrically connected to the printed circuit board 140, and are used for outputting of the detection signal or for supply of electric power to the printed circuit board 140.

Figure 3:
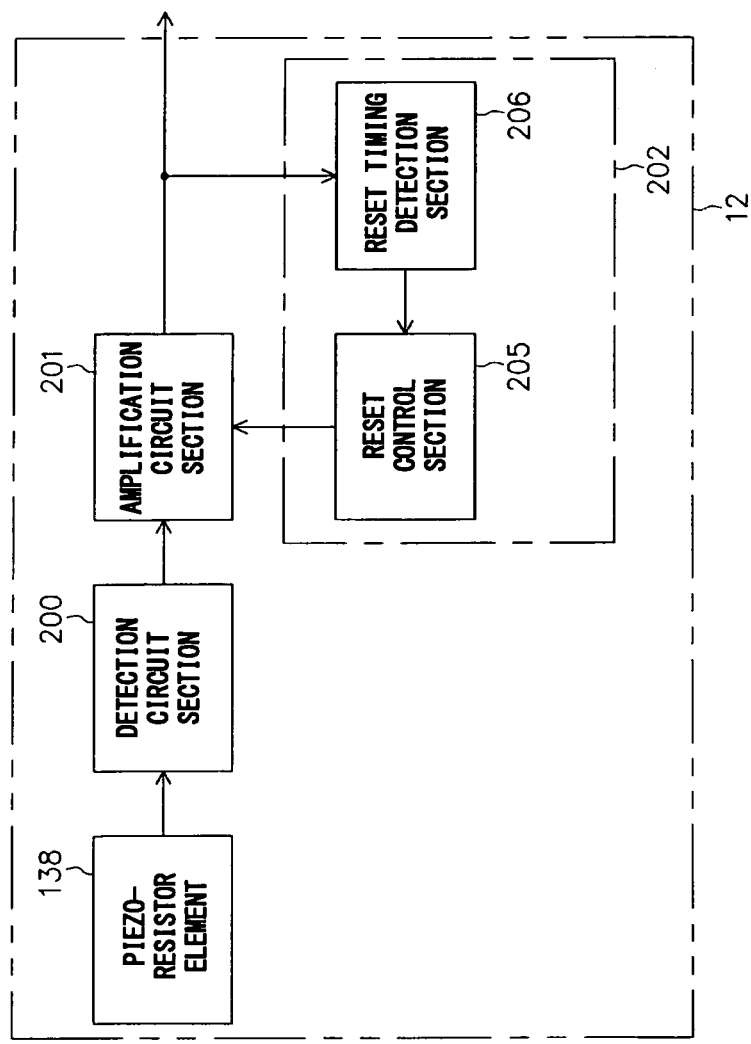
FIG. 3 is a functional block diagram showing the circuit configuration of a cylinder internal pressure detection apparatus.

The circuit configuration of the cylinder internal pressure detection apparatus 12 will be described with reference to FIG. 3. FIG. 3 is a functional block diagram showing the circuit configuration.

The cylinder internal pressure detection apparatus 12 includes a detection circuit section 200 for detecting change in the resistance of the piezoresistor element 138 as an electrical signal; an amplification circuit section 201 for amplifying this electrical signal and outputting the amplified electrical signal; and a correction circuit section 202 for correcting the output value. Of these, the piezoresistor element 138, the detection circuit section 200, and the amplification circuit section 201 constitute the cylinder internal pressure sensor in the present embodiment; and the correction circuit section 202 constitutes an apparatus for correcting the output of the cylinder internal pressure sensor (hereinafter may be referred to as the "output correction apparatus").

The correction circuit section 202 is comprised of a reset control section 205 which serves as reset means for resetting the output value of the amplification circuit section 201 to a reference value, and a reset timing detection section 206 for determining the timing of resetting.

The reset timing detection section 206 functions as period determination means for measuring, on the basis of the output waveform (cylinder internal pressure waveform) output from the amplification circuit section 201, the waveform period thereof; reset timing determination means for calculating a reset timing on the basis of the measured waveform period; and reset signal output means for outputting a reset signal to the reset control section 205 at the calculated timing.

Upon receipt of the reset signal, the reset control section 205 discharges the charge of a capacitor connected in parallel to an amplifier of the amplification circuit section 201 by means of, for example, turning a switch element on, to thereby make the potential difference between the input and output of the amplifier zero. Thus, the above-described reset processing is performed.

Figure 4:
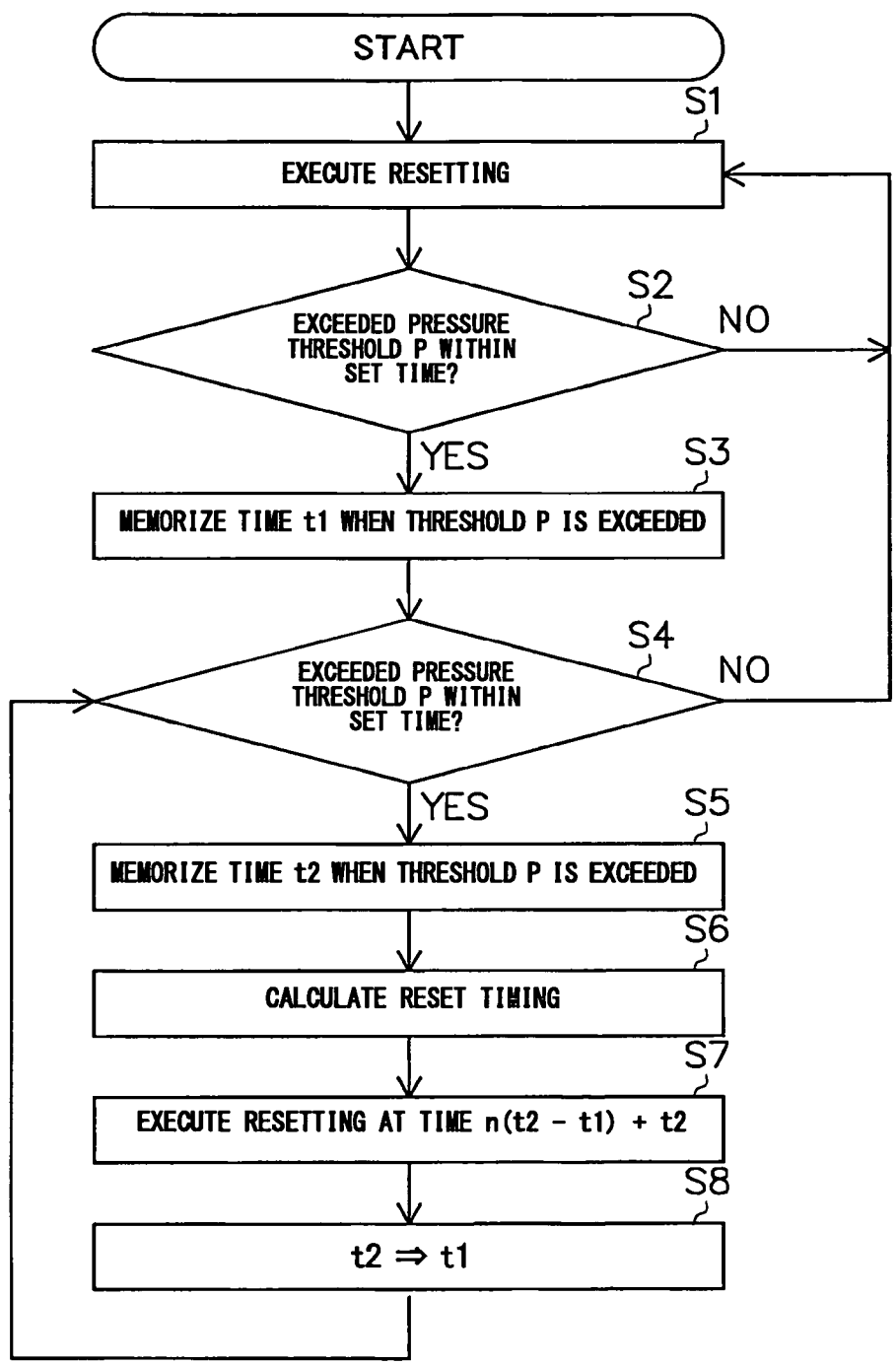
FIG. 4 is a flowchart showing the flow of correction processing.
Figure 5:
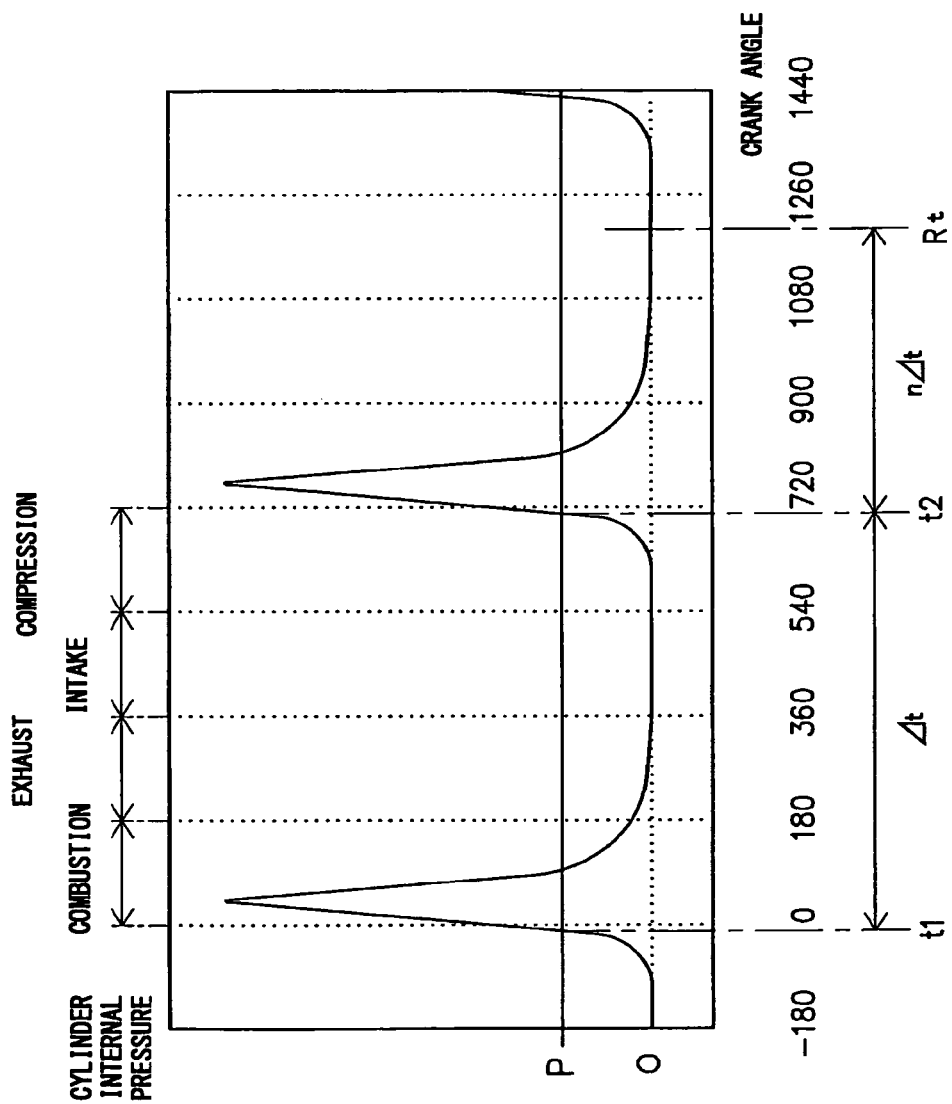
FIG. 5 is a graph showing an output waveform of an amplification circuit section.

Next, the flow of correction processing performed in the correction circuit section 202 will be described with reference to FIGS. 4 and 5. FIG. 4 is a flowchart showing the flow of the correction processing; and FIG. 5 is a graph showing an output waveform of the amplification circuit section 201. In FIG. 5, for the sake of convenience, an output waveform involving no drift is shown; and, in order to clearly show the relation between a combustion cycle of the engine 1 and cylinder internal pressure, the horizontal axis shows a crank angle rather than time, and the vertical axis shows the cylinder internal pressure corresponding to the output value of the amplification circuit section 201.

As shown in FIG. 4, immediately after startup of the engine 1 or a like event, reset processing is first executed in step S1 so as to reset the output value of the amplification circuit section 201 to O. Hereinafter, the reset processing executed in this step S1 will be referred to as "forced resetting."

In subsequent step S2, a determination is made as to whether or not the output value of the amplification circuit section 201 has exceeded a pressure threshold P (has become greater than the pressure threshold P) within a set time. This determines whether or not the timing of the forced resetting in step S1 was proper. For example, if the above-described forced resetting is performed in, for example, a combustion stroke of a single combustion cycle (combustion, exhaust, intake, compression) of the engine 1, in some cases, the event that the output value of the amplification circuit section 201 has exceeded the pressure threshold P within the set time cannot be detected. In such a case, the timing of the forced resetting is determined to be improper. Accordingly, in the case where the event that the output value of the amplification circuit section 201 has exceeded the pressure threshold P within the set time cannot be detected in step S2, the correction processing returns to step S1 so as to again perform the forced resetting. The above-mentioned steps S1 and S2 are repeated until detection of the event that the output value of the amplification circuit section 201 has exceeded the pressure threshold P within the set time.

Notably, in the present embodiment, the above-mentioned set time is a time (e.g., 0.2 sec) corresponding to one combustion cycle, determined for an assumed slowest rotational speed (e.g., 600 rpm) within a specified range (e.g., 600 rpm to 4000 rpm) in which the cylinder internal pressure detection apparatus 12 can maintain a specified accuracy. Further, the pressure threshold P is set within a range of variation of the cylinder internal pressure (the output value of the amplification circuit section 201) in the compression stroke of a single combustion cycle of the engine 1; that is, a period between a point in time when the intake valve 5 of the engine 1 is closed and a point in time when combustion starts. This setting is employed for the following reason. Even in various cases which differ from one another in terms of engine type and/or rotational speed, variation in the output waveform in the compression stroke is small, and the output value of the amplification circuit section 201 assumes a relatively constant waveform, and is stable. Accordingly, through employment of such setting, universality is enhanced.

When the event that the output value of the amplification circuit section 201 has exceeded the pressure threshold P is detected in step S2, the timing of the forced resetting is determined to be proper, and, in step S3, a time t1 at which the output value of the amplification circuit section 201 exceeded the pressure threshold P is memorized.

In subsequent step S4, a determination is made as to whether or not the output value of the amplification circuit section 201 has again exceeded the pressure threshold P within the set time following the time t1. Even in the case where the timing of the forced resetting in step S1 is proper, in some cases (e.g., a case where the amount of drift is large), the output value of the amplification circuit section 201 fails to again exceed the pressure threshold P within the set time. In such a case, in accordance with the determination in step S4, the correction processing returns to step S1 so as to again perform the forced resetting. That is, the above-mentioned steps S1 to S4 are repeated until detection of the event that the output value of the amplification circuit section 201 has properly exceeded the pressure threshold P two times.

When the event that the output value of the amplification circuit section 201 has again exceeded the pressure threshold P within the set time following the time t1 is detected in step S4, in step S5, a time t2 at which the output value of the amplification circuit section 201 again exceeded the pressure threshold P is memorized.

In subsequent step S6, a period $\Delta t$ of the output waveform of the amplification circuit section 201 is calculated from the difference (t2−t1) between the times t1 and t2 at which the output value of the amplification circuit section 201 exceeded the pressure threshold P, and a reset timing Rt is calculated from the following expression (1).

$$Rt = n\Delta t + t2 \quad (1)$$
$$= n(t2 - t1) + t2$$

That is, the reset timing Rt is a timing after elapse of a time $n\Delta t$, which is calculated by multiplying the waveform period $\Delta t$ by a coefficient n, after the time t2 at which the output value of the amplification circuit section 201 exceeded the pressure threshold P. The coefficient n in the expression is arbitrarily set within a range of 0<n<1. Since the reset timing Rt is desirably a timing at which influences of combustion and compression are small and the cylinder internal pressure is close to atmospheric pressure, in the embodiment, the coefficient n is set to 0.65 so that the reset processing is performed in the intake stroke of a single combustion cycle of the engine 1 immediately before the compression stroke thereof.

In step S7, reset processing is executed at the reset timing Rt calculated in step S6. Hereinafter, the reset processing executed in this step S7 will be referred to as the "normal resetting."

After that, in step S8, the value of the time t2 memorized as a time at which the output value exceeded the pressure threshold P for the second time is shifted (stored) as the time t1 at which the output value exceeded the pressure threshold P for the first time. After that, the correction processing returns to step S4. Thus, in the case where the output value of the amplification circuit section 201 has again exceeded the pressure threshold P within the set time following that point in time, a new time t2 is memorized, and the processing in step S5 and steps subsequent thereto is repeatedly executed. Meanwhile, in the case where the output value of the amplification circuit section 201 does not exceed the pressure threshold P within the set time following that point in time, in accordance with the determination in S4, the correction processing returns to step S1 so as to perform the forced resetting. Accordingly, in a period in which the output value of the amplification circuit section 201 is properly reset, the processing of step S4 to step S8 is repeatedly performed, whereby the normal resetting is executed for each combustion cycle of the engine 1.

As described above, in the present embodiment, timing at which the reset processing is to be performed is obtained from the period of the output waveform of the cylinder internal pressure detection apparatus 12 (the amplification circuit section 201), which corresponds to the combustion cycle of the engine 1. Therefore, the offset drift of the amplification circuit section 201 can be eliminated at a predetermined timing in the combustion cycle without use of information from the crank angle sensor 15. Accordingly, separate provision of a terminal or the like for receiving a signal from the crank angle sensor 15 is not required, and accordingly an increase in the size of the cylinder internal pressure detection apparatus 12 (the correction circuit section 202) can be prevented. Further, in the present embodiment, since output correction is performed by means of resetting the output value of the amplification circuit section 201 to the reference value without obtaining temperature, a temperature sensor is not required to be provided separately. As a result, the cylinder internal pressure of the engine 1 can be detected accurately, without making the configuration and the correction processing complex.

Further, since a measured value (variable) whose measurement time is relatively long, such as the period $\Delta t$ of the output waveform of the amplification circuit section 201, is employed as a variable for obtaining the reset timing Rt, which is rendered coincident with a desired timing in each combustion cycle of the engine 1, the ratio of its measurement error to the measured value (variable) can be reduced. As a result, the measurement error of the measured value (variable) becomes more unlikely to affect the calculation error of the reset timing Rt, whereby a deviation between the actual reset timing and a desired timing can be made relatively small, and the output of the amplification circuit section 201 can be corrected at good timing.

Second Embodiment

Figure 6:
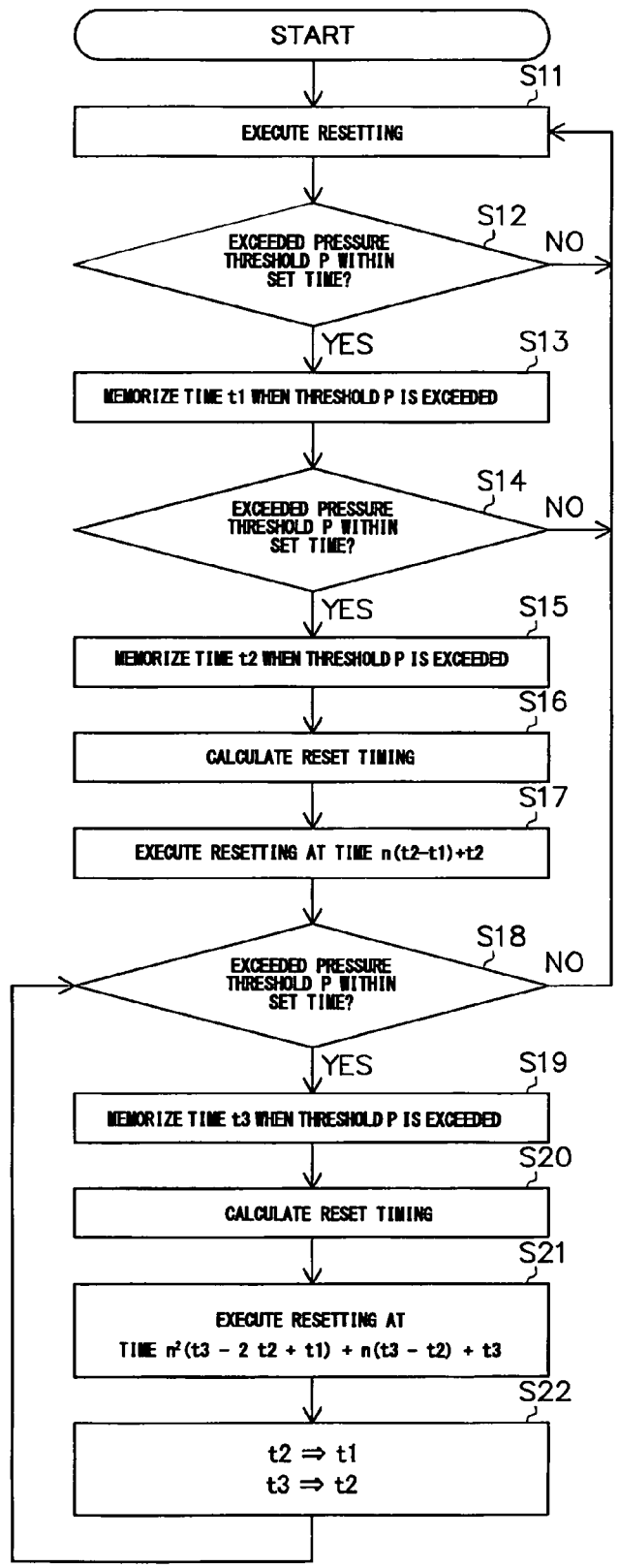
FIG. 6 is a flowchart showing the flow of correction processing in a second embodiment.
Figure 7:
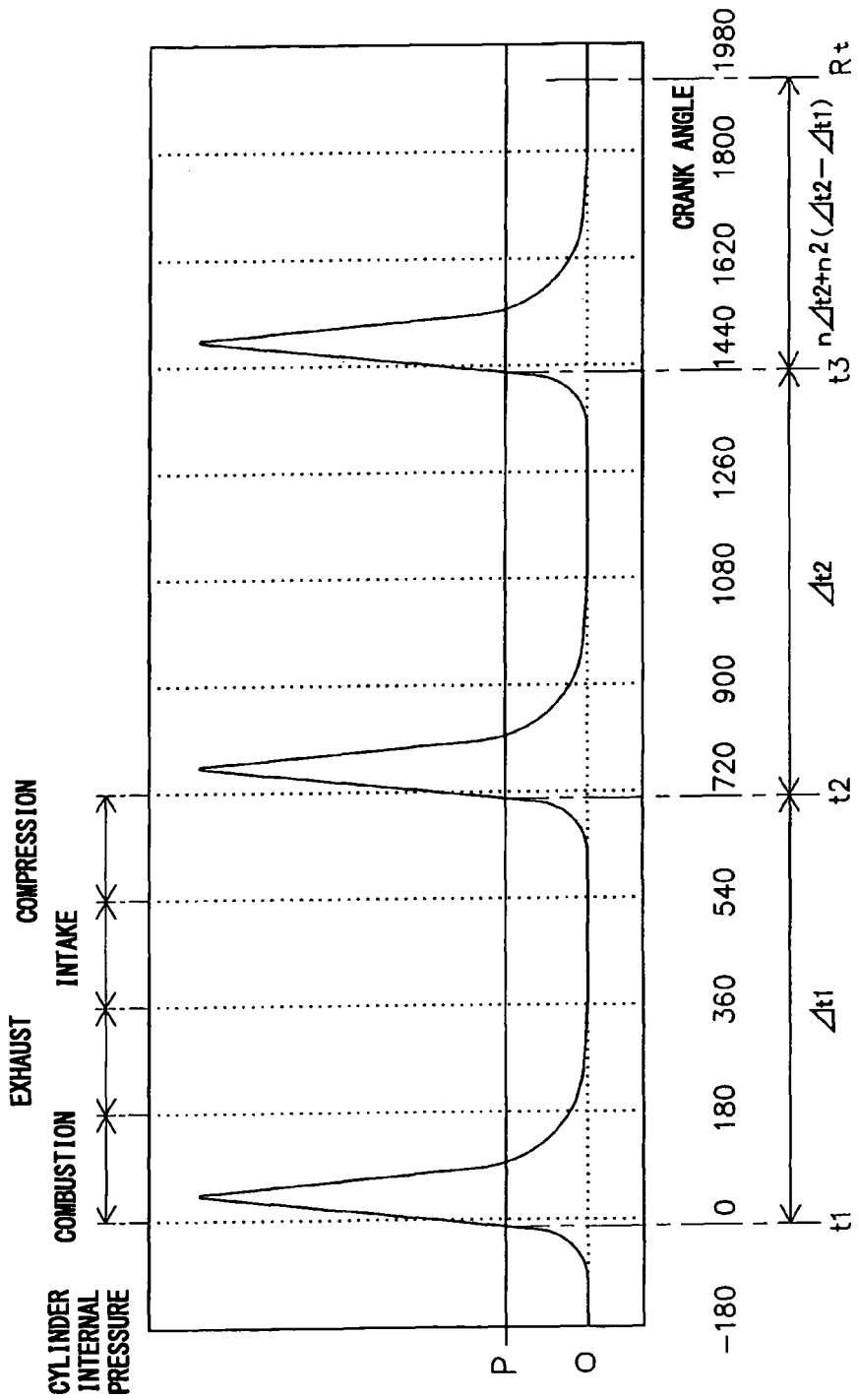
FIG. 7 is a graph showing an output waveform of the amplification circuit section in the second embodiment.

Next, a second embodiment different from the first embodiment will be described. However, since the structure, circuit configuration, etc., of the glow plug 10 and the cylinder internal pressure detection apparatus 12 are the same as those in the first embodiment, their descriptions will not repeated. The present embodiment differs from the first embodiment in the correction processing performed in the correction circuit section 202, and the correction processing of the present embodiment will be described with reference to FIGS. 6 and 7. FIG. 6 is a flowchart showing the flow of the correction processing. FIG. 7 is a graph showing the output waveform of the amplification circuit section 201 as in the case of FIG. 5.

As shown FIG. 6, in steps S11 to S17 of the correction processing of the present embodiment, processing similar to the processing in steps S1 to S7 of the first embodiment is performed. That is, in step S11, the forced resetting is first executed so as to reset the output value of the amplification circuit section 201 to O.

In step S12, a determination is made as to whether or not the output value of the amplification circuit section 201 has exceeded the pressure threshold P within the set time. In the case where the event that the output value has exceeded the pressure threshold P cannot be detected, the correction processing returns to step S11 so as to again perform the forced resetting. Meanwhile, in the case where the event that the output value has exceeded the pressure threshold P is detected, in step S13, a time t1 at which the output value exceeded the pressure threshold P is memorized.

In step S14, a determination is made as to whether or not the output value of the amplification circuit section 201 has again exceeded the pressure threshold P within the set time following the time t1. In the case where the event that the output value has exceeded the pressure threshold P cannot be detected, the correction processing returns to step S11 so as to again perform the forced resetting. Meanwhile, in the case where the event that the output value has exceeded the pressure threshold P is detected, in step S15, a time t2 at which the output value exceeded the pressure threshold P is memorized.

In subsequent step S16, the period of the output waveform of the amplification circuit section 201 is calculated from the difference (t2−t1) between the times t1 and t2 at which the output value of the amplification circuit section 201 exceeded the pressure threshold P, and a reset timing Rt is calculated from the arithmetic expression (1) shown in the above-described first embodiment. Although the coefficient n is an arbitrarily set coefficient, for the same reason as in the above-described first embodiment, the coefficient n is set to 0.65 (this also applies to arithmetic expression (2) which will be described later).

In step S17, the normal resetting is executed at the reset timing Rt calculated in step S16.

In step S18, a determination is made as to whether or not the output value of the amplification circuit section 201 has again exceeded the pressure threshold P within the set time following the time t2. This processing is performed for the same reason as mentioned for step S14. Accordingly, in the case where the event that the output value has exceeded the pressure threshold P cannot be detected in step S18, the correction processing returns to step S11 so as to again perform the forced resetting. Meanwhile, in the case where the event that the output value has exceeded the pressure threshold P is detected, in step S19, a time t3 at which the output value exceeded the pressure threshold P is memorized.

In subsequent step S20, a first waveform period Δt1 is calculated from the difference (t2−t1) between the times t1 and t2 at which the output value exceeded the pressure threshold P; a second waveform period Δt2 is calculated from the difference (t3−t2) between the times t2 and t3 at which the output value exceeded the pressure threshold P; an amount of change (Δt2−Δt1) therebetween is calculated; and a reset timing Rt is calculated from the following expression (2).

$$Rt = n\{n(\Delta t2 - \Delta t1) + \Delta t2\} + t3 \quad (2)$$
$$= n2(\Delta t2 - \Delta t1) + n\Delta t2 + t3$$
$$= n2(t3 - 2 \cdot t2 + t1) + n(t3 - t2) + t3$$

That is, the reset timing Rt is a timing after elapse of a time nΔt2, which is obtained by multiplying the waveform period Δt2 by a predetermined coefficient n, and a time n2(Δt2−Δt1), which is obtained by multiplying the change amount (Δt2−Δt1) of the waveform period by a predetermined coefficient n2, after the time t3 at which the output value of the amplification circuit section 201 exceeded the pressure threshold P.

In step S21, the reset processing (normal resetting) is executed at the reset timing Rt calculated in step S20. After that, in step S22, the value of the time t2 memorized as a time at which the output value exceeded the pressure threshold P for the second time is shifted (stored) as the time t1 at which the output value exceeded the pressure threshold P for the first time; and the value of the time t3 memorized as a time at which the output value exceeded the pressure threshold P for the third time is shifted (stored) as the time t2 at which the output value exceeded the pressure threshold P for the second time. After that, the correction processing returns to step S18. Thus, in the case where the output value of the amplification circuit section 201 has again exceeded the pressure threshold P within the set time following that point in time, a new time t3 is memorized, and the processing in step S19 and steps subsequent thereto is repeatedly executed. Meanwhile, in the case where the output value of the amplification circuit section 201 does not exceed the pressure threshold P within the set time following that point in time, in accordance with the determination in S18, the correction processing returns to step S11 so as to perform the forced resetting. Accordingly, in a period in which the output value of the amplification circuit section 201 is properly reset, the processing of step S18 to step S22 is repeatedly performed, whereby the normal resetting is executed for each combustion cycle of the engine 1.

As described in detail, in the present embodiment, the reset timing Rt is calculated in consideration of not only the period Δt2 (or Δt1) of the output waveform of the amplification circuit section 201 but also the change amount Δt2−Δt1 of the waveform period. In a period in which the rotational speed of the engine 1 changes (acceleration/deceleration), an optimum reset timing Rt cannot be calculated only from the period Δt2 (or Δt1) of the output waveform of the amplification circuit section 201. In contrast, in the present embodiment, an optimal reset timing Rt can be obtained in consideration of change in the rotational speed of the engine 1. As a result, the deviation between the timing of actually effected resetting and a desired timing can be reduced.

Notably, the present invention is not limited to the details of the above-described embodiment, and may be practiced as follows.

(a) In the above-described embodiments, the cylinder internal pressure detection apparatus 12 is illustrated as including, in an united form, the cylinder internal pressure sensor comprised of the piezoresistor element 138, etc., and the output correction apparatus comprised of the correction circuit section 202, etc. The configuration of the cylinder internal pressure detection apparatus 12 is not limited thereto, and the cylinder internal pressure detection apparatus 12 may be configured such that the output correction apparatus and the cylinder internal pressure sensor are provided separately. For example, the output correction apparatus of the cylinder internal pressure sensor may be provided in the electronic control unit (ECU) 18. Further, the cylinder internal pressure detection apparatus 12 may be separated from the glow plug 10.

(b) In the above-described embodiments, the piezoresistor element 138 is employed as pressure sensing means for detecting the cylinder internal pressure of the engine 1. However, the pressure sensing means is not limited to the piezoresistor element, and the present invention can be applied to a structure which employs other types of pressure sensing means which may suffer offset drift, such as a piezoelectric element and a metallic-resistor-type strain gage. Even in such a case, the present invention achieves an action and effects similar to those attained in the above-described embodiments.

(c) In the above-described embodiments, the period of the output waveform of the amplification circuit section 201 is obtained through measurement of a time interval between a point in time when the output value of the amplification circuit section 201 exceeded the predetermined pressure threshold P and a point in time when the output value again exceeded the predetermined pressure threshold P. However, the method of obtaining the waveform period is not limited thereto. For example, the period of the output waveform of the amplification circuit section 201 may be obtained through measurement of a time interval between a point in time when the output value of the amplification circuit section 201 became lower than a predetermined pressure threshold P and a point in time when the output value again became lower than the predetermined pressure threshold P. In this case, a determination is made as to whether or not the output value of the amplification circuit section 201 becomes lower than the pressure threshold P, for example, in a later period of the combustion stroke of a single combustion cycle of the engine 1 or at the beginning of the exhaust stroke thereof. However, in such a period, the output waveform of the amplification circuit section 201 greatly changes due to, for example, difference in the rotational speed of the engine 1, possibly, resulting in an increased measurement error of the waveform period. Therefore, the method of obtaining the waveform period from the output waveform (output value) of the amplification circuit section 201 in the compression stroke as in the above-described embodiments is more preferred.

(d) The arithmetic expression for calculating the reset timing Rt is not limited to the above-described arithmetic expressions (1) and (2). For example, in the case where a higher degree of accuracy is required, the number of terms of each expression may be increased. Further, in the above-described embodiments, the reset timing Rt is set to coincide with the intake stroke. However, the reset timing Rt may be set to coincide with a timing at the end of the exhaust stroke or the beginning of the compression stroke and at which the cylinder internal pressure becomes close to atmospheric pressure. Accordingly, the coefficient n can also be arbitrarily set in accordance with a desired timing in a single combustion cycle of the engine 1. Further, in the above-described embodiments, the time t2 or the like at which the output value exceeded the pressure threshold P is used as a reference point for obtaining the reset timing Rt. However, a point in time when the resetting was performed previously; i.e., the previous reset timing Rt, or the like may be used as the reference point for obtaining the reset timing Rt.

(e) The following configuration may be employed in order to implement the above-described first and second embodiments. The present configuration is characterized by the configuration of the correction circuit section 202; in particular, the reset timing detection section 206, and the correction processing executed thereby.

Figure 8:
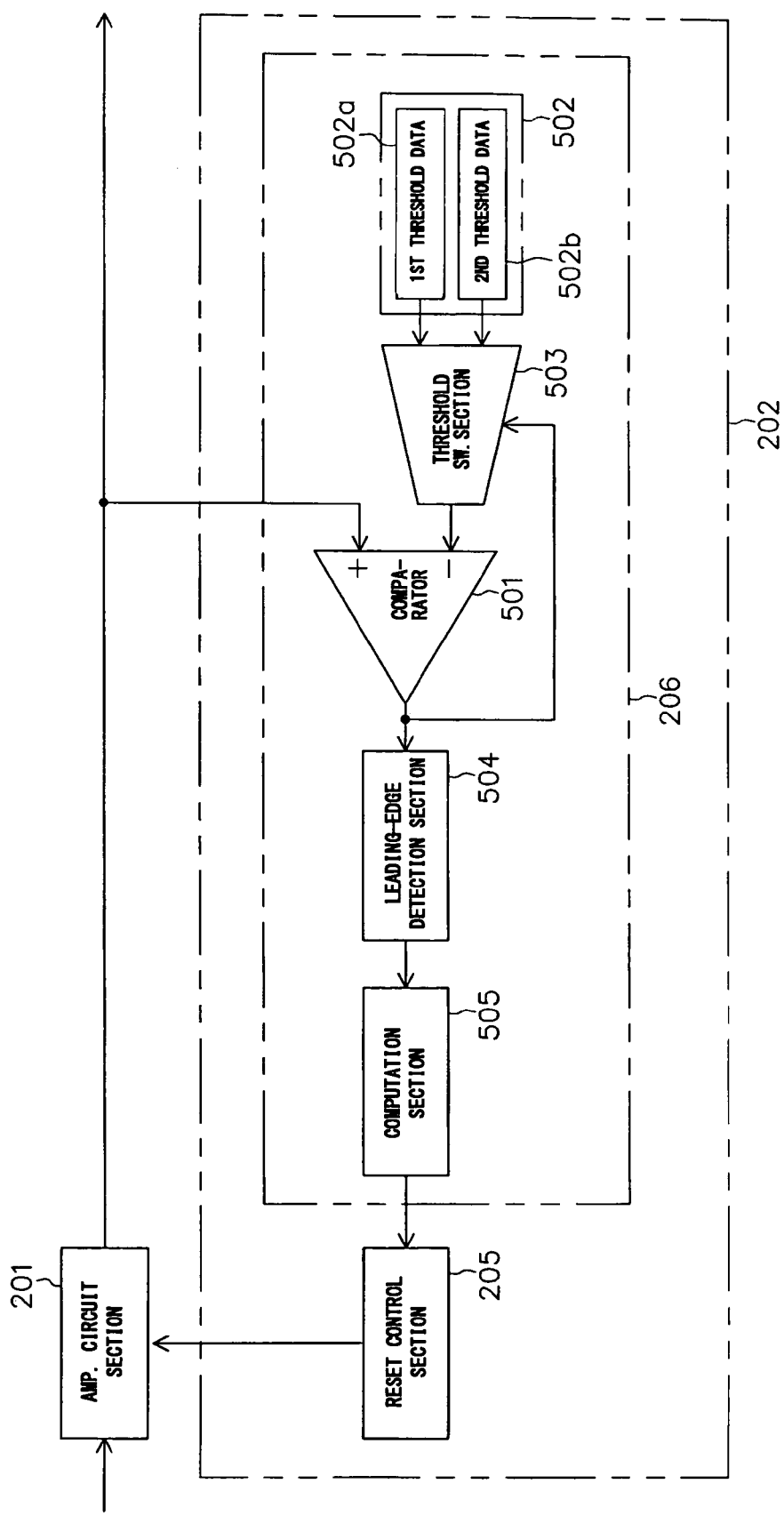
FIG. 8 is a functional block diagram showing the circuit configuration of a reset timing detection section.

First, the circuit configuration of the reset timing detection section 206 will be described with reference to a functional block diagram shown in FIG. 8.

The reset timing detection section 206 according to the present configuration includes a comparator 501 which compares the output value of the amplification circuit section 201 and the pressure threshold P and which outputs a rectangular wave signal whose output level changes in accordance with the result of the comparison; a memory 502 which stores two different values as the pressure threshold P; a threshold switching section 503 which selects, through switching, one of the two values stored in the memory 502 and outputs the selected value to the comparator 501; a leading-edge detection section 504 which detects a leading edge of the rectangular wave signal output from the comparator 501; and a computation section 505 which calculates the reset timing Rt on the basis of the result of the detection performed by the leading-edge detection section 504 and outputs a reset signal to the reset control section 205 at the timing Rt.

The non-inverting input terminal (+) of the comparator 501 is connected to the amplification circuit section 201, and the inverting input terminal (−) of the comparator 501 is connected to the threshold switching section 503. The comparator 501 outputs a low level signal when the output value of the amplification circuit section 201 is not greater than the pressure threshold P, and outputs a high level signal when the output value of the amplification circuit section 201 is greater than the pressure threshold P (see FIG. 9($b$)).

The memory 502 includes a first threshold data storage area 502a and a second threshold data storage area 502b. A first threshold value P1 and a second threshold value P2 are stored in the two storage areas 502a and 502b as the pressure threshold P. Arbitrary values may be set as the threshold values P1 and P2, so long as at least a relation P1>P2 is satisfied. For example, in the present configuration, 0.5 MPa is stored as the first threshold value P1, and 0.4 MPa is stored as the second threshold value P2. However, in order to avoid the influence of noise as described later, the difference between the two threshold values P1 and P2 must be set to be greater than the amplitude of an expected noise waveform. For example, in the case where the maximum amplitude of such a noise waveform can be assumed to be Vs, the difference between the two threshold values P1 and P2 is desirably set to be greater than Vs but less than Vs·10. Notably, the value of "Vs·10" is about one-tenth of the output value of the cylinder internal pressure sensor (that is, the value input to the correction apparatus).

Meanwhile, the threshold switching section 503 outputs a signal whose level corresponds to the first threshold value P1 or the second threshold value P2, depending on the output level of the comparator 501. Thus, the value of the pressure threshold P, which serves as a criterion for decision, is changed to the first threshold value P1 or the second threshold value P2, depending on whether or not the output value of the amplification circuit section 201 is greater than the pressure threshold P.

Figure 9:
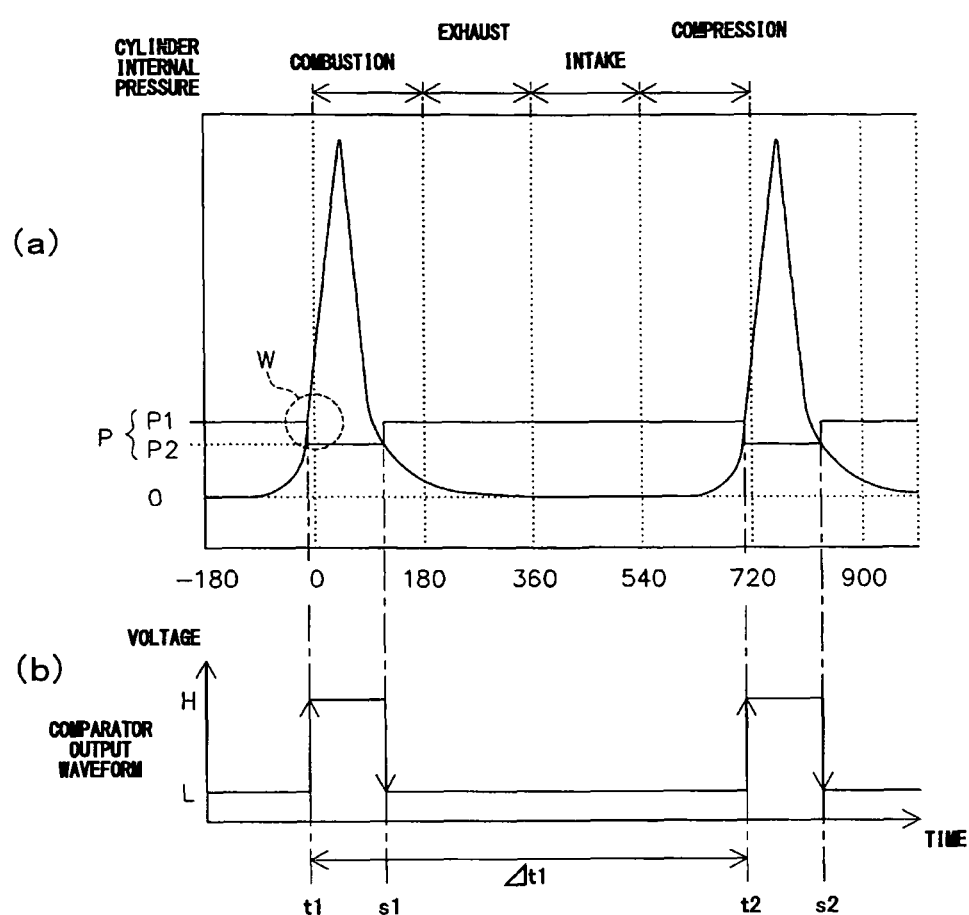
FIG. 9 (a) is a graph showing an output waveform of the amplification circuit section, and FIG. 9 (b) is a time chart showing an output waveform of a comparator corresponding thereto.

Operation of the above-described configuration will be described. In a situation where, as shown in FIGS. 9($a$) and 9($b$), the output value of the amplification circuit section 201 is lower than the pressure threshold P and the output level of the comparator 501 is low, the value of the pressure threshold P is the first threshold value P1. FIG. 9($a$) is a graph showing the output waveform of the amplification circuit section 201 as in FIG. 5, and FIG. 9(b) is a time chart showing the output waveform of the comparator 501 corresponding thereto.

At a point in time t1 when the output value of the amplification circuit section 201 exceeds the first threshold value P1 and the output level of the comparator 501 is switched to high (when a leading edge of the rectangular wave signal is detected), the value of the pressure threshold P is changed from the first threshold value P1 to the second threshold value P2, which is lower than the first threshold value P1. Throughout a period in which the output value of the amplification circuit section 201 is greater than the pressure threshold P and the output level of the comparator 501 is high, the value of the pressure threshold P is maintained at the second threshold value P2.

After that, at a point in time s1 when the output value of the amplification circuit section 201 becomes lower than the second threshold value P2 and the output level of the comparator 501 is switched to low (when a trailing edge of the rectangular wave signal is detected), the value of the pressure threshold P is changed to the first threshold value P1.

After that point in time, the switching of the value of the pressure threshold P is repeatedly performed in each combustion cycle of the engine 1.

As a result, a time interval between a predetermined point in time t1 at which the output value of the amplification circuit section 201 exceeded the first threshold value P1 (when a leading edge is detected) and a point in time t2 at which the output value of the amplification circuit section 201 again exceeded the first threshold value P1 (when a following leading edge is detected) is measured as the period $\Delta t$ of the output waveform of the amplification circuit section 201. For example, when the present configuration is employed in the first embodiment, a reset signal is output to the reset control section 205 at a reset timing Rt calculated on the basis of the measured period and in accordance with the above-mentioned arithmetic expression (1), whereby the output value of the amplification circuit section 201 is reset to the reference value.

Figure 10:
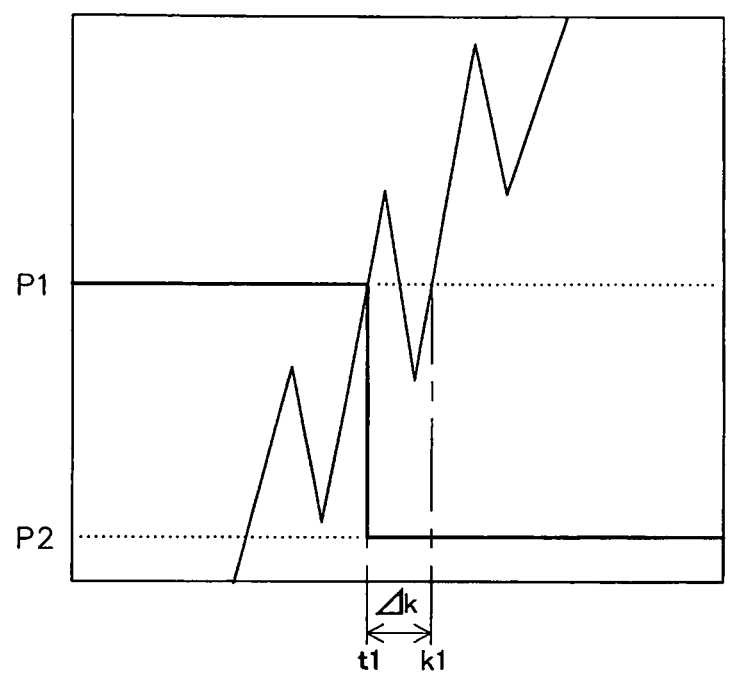
FIG. 10 is a partial enlarged view schematically showing a region of FIG. 9 surrounded by a broken line W.

As shown in FIG. 10, in general, due to influence of vibration or the like from the engine 1, a noise waveform whose period is shorter than that of the output waveform of the amplification circuit section 201 may be superimposed on the output waveform of the amplification circuit section 201. FIG. 10 is a partial enlarged view schematically showing a region of FIG. 9 surrounded by a broken line W. Therefore, in an assumed case where the pressure threshold P is permanently fixed to the first threshold value P1, a time interval between a point in time t1 at which the output value of the amplification circuit section 201 exceeded the first threshold value P1 and a point in time k1 at which the output value again exceeded the first threshold value P1; i.e., a period $\Delta k$ of a noise waveform, may be erroneously measured as the period $\Delta t$ of the output waveform of the amplification circuit section 201.

In contrast, according to the present configuration, at the point in time t1 at which the output value of the amplification circuit section 201 exceeded the first threshold value P1, the value of the pressure threshold P is changed to the second threshold value P2, which is not affected by the noise waveform. Therefore, the time interval between t1 and t2, which must be measured as the period $\Delta t$ of the output waveform of the amplification circuit section 201, can be measured properly. As a result, the accuracy of period measurement can be improved.

Notably, by a procedure similar to the above-described procedure, there can be realized a configuration for determining the period of the output waveform of the amplification circuit section 201 on the basis of trailing edges of the rectangular wave signal; that is, through measurement of a time interval between a predetermined point in time s1 at which the output value of the amplification circuit section 201 became lower than the pressure threshold P and a point in time s2 at which the output value of the amplification circuit section 201 again became lower than the pressure threshold P.

(f) The above-described embodiments require at least three timers; i.e., a timer for measuring the period $\Delta t$ of the output waveform of the amplification circuit section 201, a timer for determining whether or not the reset timing Rt (timing of normal resetting) is reached, and a timer for determining whether or not the timing of forced resetting is reached. However, since the integrated circuit of the cylinder internal pressure detection apparatus 12 incorporated into the glow plug 10 is very small, disposing three timer circuits there may result in an increase in the scale of the circuit and an increase in production cost.

Figure 11:
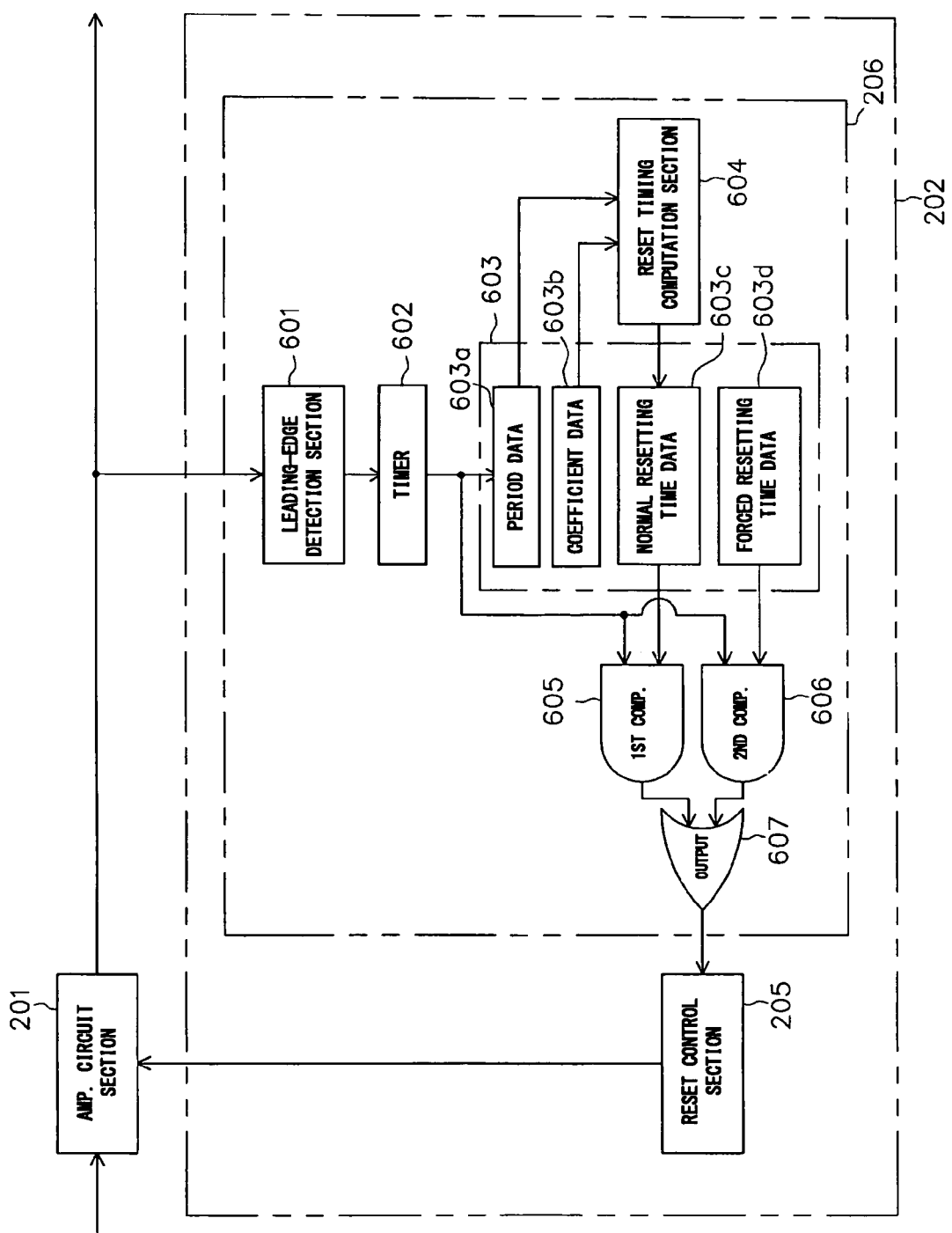
FIG. 11 is a functional block diagram showing the circuit configuration of a reset timing detection section.

In view of the above-described problem, a configuration which can realize the above-described embodiment through use of a single timer circuit will be shown below. First, the circuit configuration of the reset timing detection section 206 will be described with reference to a functional block diagram shown in FIG. 11.

The reset timing detection section 206 of the present configuration includes a leading-edge detection section 601 which detects a leading edge of a rectangular wave signal produced through comparison between the output value of the amplification circuit section 201 and the pressure threshold P; a timer 602 serving as a time measurement means; a memory 603 which stores time data obtained from the timer 602 and previously set various numerical data; a reset timing computation section 604 which calculates a reset timing on the basis of the data stored in the memory 603; first and second comparison sections 605 and 606 which compare the time data obtained from the timer 602 and predetermined time data stored in the memory 603; and an output section 607 which outputs a reset signal to the reset control section 205 on the basis of the signal output from the first comparison section 605 or the second comparison section 606.

The memory 603 includes a period data storage area 603a for storing data representing the period of the output waveform of the amplification circuit section 201 (e.g., the above-mentioned period $\Delta t$ or the like); a coefficient data storage area 603b for storing data representing coefficients (e.g., the above-mentioned coefficient n, etc.) used in the arithmetic expressions of the above-described embodiments; a normal resetting time data storage area 603c for storing data representing a time interval (e.g., the above-mentioned n$\Delta t$ or the like) that passes before reaching the reset timing Rt calculated by the reset timing computation section 604, and a forced resetting time data storage area 603d for storing data representing the time intervals for executing the forced resetting (e.g., the above-mentioned set time of 0.2 sec or the like).

Of these, the data stored in the period data storage area 603a and the data stored in the normal resetting time data storage area 603c are rewritten when necessary. Meanwhile, arbitrary values are previously set or stored in the coefficient data storage area 603b and the forced resetting time data storage area 603d.

Operation of the above-described configuration will be described. When the leading-edge detection section 601 detects a leading edge of the rectangular wave signal, a value of the timer 602 at that point in time is written into the period data storage area 603a of the memory 603, and the value of the timer 602 is reset to 0. This processing is performed every time a leading edge of the rectangular wave signal is detected by the leading-edge detection section 601. As a result of repeated performance of this processing, in the period data storage area 603*a*, a time interval between a point in time t1 at which a previous leading edge of the rectangular wave signal is detected and a point in time t2 at which a present leading edge of the rectangular wave signal is detected is written as period data (e.g., period Δt=0.1 sec).

Subsequently, the reset timing computation section 604 calculates the reset timing Rt (=nΔt+t2) of the normal resetting in accordance with, for example, the arithmetic expression (1) of the first embodiment, and on the basis of the period data stored in the period data storage area 603*a* of the memory 603 and the coefficient data (e.g., coefficient n=0.5) stored in the coefficient data storage area 603*b* in advance, and stores the calculated reset timing Rt in the normal resetting time data storage area 603*c*. Notably, in the case of the present configuration, the point in time t2, which serves as a reference point, is a point in time at which the timer 602 is reset to 0. Therefore, data representing the time interval between the reference point and the reset timing Rt (e.g., nΔt=0.05 sec) are written into the normal resetting time data storage area 603*c*.

The first comparison section 605 compares the value of the timer 602 and the value stored in the normal resetting time data storage area 603*c* when necessary. The first comparison section 605 outputs a low level signal when the two values do not coincide with each other, and outputs a high level signal when the two values coincide with each other.

Meanwhile, the second comparison section 606 compares the value of the timer 602 and the value stored in the forced resetting time data storage area 603*d* when necessary. The second comparison section 606 outputs a low level signal when the two values do not coincide with each other, and outputs a high level signal when the two values coincide with each other.

The output section 607, which is comprised of an OR circuit, outputs a reset signal to the reset control section 205 when it receives a high level signal from the first comparison section 605 or the second comparison section 606.

Thus, every time a leading edge of the rectangular wave signal is periodically detected by the leading-edge detection section 601 and a predetermined time elapses, the normal resetting is executed. Meanwhile, when the leading-edge detection section 601 fails to detect a leading edge of the rectangular wave signal within the set time stored in the forced resetting time data storage area 603*d* and the value of the timer 602 exceeds a value corresponding to the set time, the forced resetting is executed.

By virtue of the above-described configuration, time measurement for measuring the waveform period of the amplification circuit section 201, time measurement for determining whether or not the timing of normal resetting is reached, and time measurement for determining whether or not the timing of forced resetting is reached can be performed through use of a single timer 602. As a result, provision of a plurality of timer circuits is not required, and an increase in the scale of the circuit and an increase in production cost can be suppressed. Needless to say, in a configuration in which forced resetting is not performed, a portion of the configuration related to the forced resetting can be omitted.

DESCRIPTION OF REFERENCE NUMERALS

1 engine
10 glow plug
12 cylinder internal pressure detection apparatus
138 piezoresistor element
201 amplification circuit section
202 correction circuit section
205 reset control section
206 reset timing detection section
O reference value
P pressure threshold
Δt waveform period
Rt reset timing Having described the invention, the following is claimed:

1. An output correction apparatus comprising:
   reset means for
      obtaining an output waveform, as an output value, from a cylinder internal pressure sensor, the output waveform representing cylinder internal pressure of an internal combustion engine or a rate of change of the cylinder internal pressure of the internal combustion engine, and
      resetting the output value representing the output waveform to a reference value;
   period determination means for determining a period of the output waveform on the basis of the output waveform obtained from the cylinder internal pressure sensor; and
   reset timing determination means for determining a timing for performing the resetting on the basis of the period determined by the period determination means.

2. An output correction apparatus according to claim 1, wherein at least time measurement for measuring the waveform period and time measurement for determining whether or not the reset timing is reached are performed by use of a single time measurement means.

3. An output correction apparatus according to claim 1, wherein the period determination means determines, as the waveform period, a time interval between a point in time at which the output value of the cylinder internal pressure sensor has become greater than a threshold and a point in time at which the output value again has become greater than the threshold.

4. An output correction apparatus according to claim 3, wherein, when the output value of the cylinder internal pressure sensor has become greater than the threshold, the threshold is decreased.

5. An output correction apparatus according to claim 3, wherein
   the period determination means measures an amount of change of the waveform period from a difference between:
      (1) a time interval between (a) a first point in time at which the output value of the cylinder internal pressure sensor has become greater than the threshold and (b) a second point in time at which the output value again has become greater than the threshold, and
      (2) a time interval between (a) the second point in time and (b) a third point in time at which the output value again has become greater than the threshold; and
   the reset timing determination means calculates the reset timing in consideration of the amount of change of the waveform period.

6. An output correction apparatus according to claim 3, wherein the threshold is set within a range of variation of the cylinder internal pressure of the internal combustion engine in a compression stroke of a single combustion cycle of the internal combustion engine.

7. An output correction apparatus according to claim 1, wherein the period determination means determines, as the waveform period, a time interval between a point in time at which the output value of the cylinder internal pressure sensor has become lower than a threshold and a point in time at which the output value again has become lower than the threshold in the predetermined direction.

8. An output correction apparatus according to claim 7, wherein, when the output value of the cylinder internal pressure sensor has become lower than the threshold, the threshold is increased.

9. An output correction apparatus according to claim 7, wherein
the period determination means measures an amount of change of the waveform period from a difference between:
(1) a time interval between (a) a first point in time at which the output value of the cylinder internal pressure sensor has become lower than the threshold and (b) a second point in time at which the output value again has become lower than the threshold, and
(2) a time interval between (a) the second point in time and (b) a third point in time at which the output value again has become lower than the threshold; and
the reset timing determination means calculates the reset timing in consideration of the amount of change of the waveform period.

10. An output correction apparatus according to claim 7, wherein the threshold is set within a range of variation of the cylinder internal pressure of the internal combustion engine in a compression stroke of a single combustion cycle of the internal combustion engine.

11. A cylinder internal pressure detection apparatus comprising:
a cylinder internal pressure sensor which outputs an electrical signal representing cylinder internal pressure of an internal combustion engine or a rate of change of the cylinder internal pressure of the internal combustion engine; and
an output correction apparatus comprising:
reset means for
obtaining an output waveform, as an output value, from a cylinder internal pressure sensor, the output waveform representing cylinder internal pressure of an internal combustion engine or a rate of change of the cylinder internal pressure of the internal combustion engine, and
resetting the output value representing the output waveform to a reference value;
period determination means for determining a period of the output waveform on the basis of the output waveform obtained from the cylinder internal pressure sensor; and
reset timing determination means for determining a timing for performing the resetting on the basis of the period determined by the period determination means.

12. A cylinder internal pressure detection apparatus according to claim 11, wherein at least time measurement for measuring the waveform period and time measurement for determining whether or not the reset timing is reached are performed by use of a single time measurement means.

13. A cylinder internal pressure detection apparatus according to claim 11, wherein the period determination means determines, as the waveform period, a time interval between a point in time at which the output value of the cylinder internal pressure sensor has become greater than a threshold and a point in time at which the output value again has become greater than the threshold.

14. A cylinder internal pressure detection apparatus according to claim 13, wherein, when the output value of the cylinder internal pressure sensor has become greater than the threshold, the threshold is decreased.

15. A cylinder internal pressure detection apparatus according to claim 13,
the period determination means measures an amount of change of the waveform period from a difference between:
(1) a time interval between (a) a first point in time at which the output value of the cylinder internal pressure sensor has become greater than the threshold and (b) a second point in time at which the output value again has become greater than the threshold, and
(2) a time interval between (a) the second point in time and (b) a third point in time at which the output value again has become greater than the threshold; and
the reset timing determination means calculates the reset timing in consideration of the amount of change of the waveform period.

16. A cylinder internal pressure detection apparatus according to claim 13, wherein the threshold is set within a range of variation of the cylinder internal pressure of the internal combustion engine in a compression stroke of a single combustion cycle of the internal combustion engine.

17. A cylinder internal pressure detection apparatus according to claim 11, wherein the period determination means determines, as the waveform period, a time interval between a point in time at which the output value of the cylinder internal pressure sensor has become lower than a threshold and a point in time at which the output value again has become lower than the threshold.

18. A cylinder internal pressure detection apparatus according to claim 17, wherein, when the output value of the cylinder internal pressure sensor has become lower than the threshold, the threshold is increased.

19. A cylinder internal pressure detection apparatus according to claim 17,
the period determination means measures an amount of change of the waveform period from a difference between:
(1) a time interval between (a) a first point in time at which the output value of the cylinder internal pressure sensor has become lower than the threshold and (b) a second point in time at which the output value again has become lower than the threshold in the predetermined direction, and
(2) a time interval between (a) the second point in time and (b) a third point in time at which the output value again has become lower than the threshold; and
the reset timing determination means calculates the reset timing in consideration of the amount of change of the waveform period.

20. A cylinder internal pressure detection apparatus according to claim 17, wherein the threshold is set within a range of variation of the cylinder internal pressure of the internal combustion engine in a compression stroke of a single combustion cycle of the internal combustion engine.

* * * * *

UNITED STATES PATENT AND TRADEMARK OFFICE
CERTIFICATE OF CORRECTION

| | | |
|---|---|---|
| PATENT NO. | : 8,413,495 B2 | Page 1 of 1 |
| APPLICATION NO. | : 12/734659 | |
| DATED | : April 9, 2013 | |
| INVENTOR(S) | : Higuchi et al. | |

It is certified that error appears in the above-identified patent and that said Letters Patent is hereby corrected as shown below:

On the title page, item (73) Assignee:, line 1, replace "NGK Spark Plus Co., Ltd., Aichi (JP)" with "NGK Spark Plug Co., Ltd., Aichi (JP)."

On the Title Page:

The first or sole Notice should read --

Subject to any disclaimer, the term of this patent is extended or adjusted under 35 U.S.C. 154(b) by 344 days.

Signed and Sealed this
Fourth Day of June, 2013

Teresa Stanek Rea
*Acting Director of the United States Patent and Trademark Office*